Dec. 12, 1933.  I. L. SPENNY  1,939,148

FISHING REEL

Filed July 30, 1932  2 Sheets-Sheet 1

Inventor
Ira L. Spenny

By Geo. P. Kimmel
Attorney

Dec. 12, 1933.  I. L. SPENNY  1,939,148
FISHING REEL
Filed July 30, 1932  2 Sheets-Sheet 2
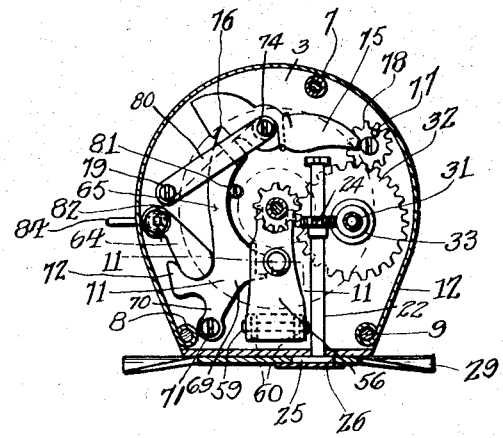
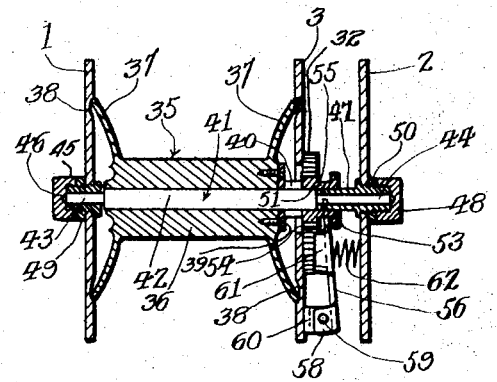
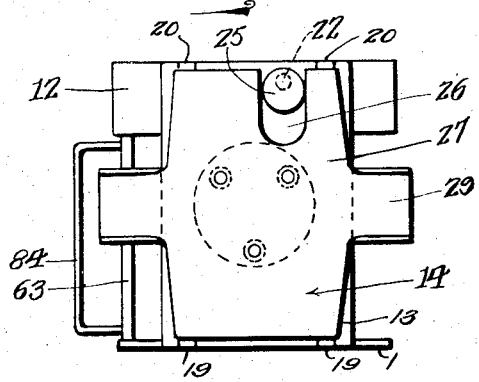
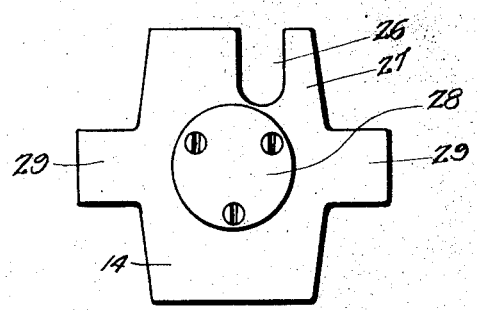
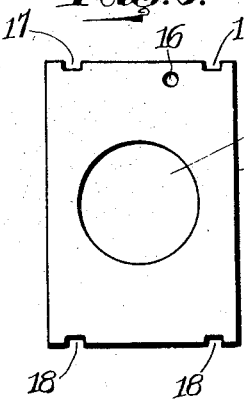
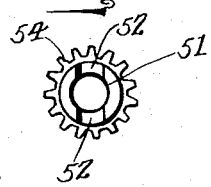
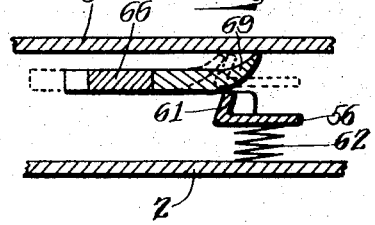
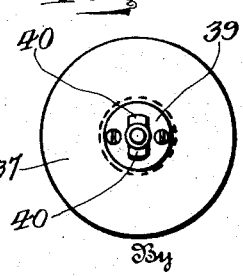
Inventor
Ira L. Spenny
By Geo. P. Kimmel
Attorney Patented Dec. 12, 1933

1,939,148

UNITED STATES PATENT OFFICE 1,939,148

FISHING REEL

Ira L. Spenny, Versailles, Ohio

Application July 30, 1932. Serial No. 626,934

6 Claims. (Cl. 242—84.7)

This invention relates to fishing reels, and has for its object to provide, a fishing reel with means, in a manner as hereinafter set forth, to enable for the free revolving of the spool when it is desired.

A further object of the invention is to provide, a fishing reel with means, in a manner as hereinafter set forth, for level winding the line.

A further object of the invention is to provide, a fishing reel with means for revolving the spool, means for disconnecting the revolving means from the spool, and means for automatically connecting the spool after the latter has been disconnected from the former.

A further object of the invention is to provide, in a manner as hereinafter set forth, a manually releasable and automatically engaging clutch between the spool and the revolving means for the latter.

Further objects of the invention are to provide, in a manner as hereinafter set forth, a fishing reel embodying the functions referred to, which is comparatively simple in its construction and arrangement, strong, durable, compact, thoroughly efficient in its use, readily assembled, easily repaired when occasion requires, and comparatively inexpensive to manufacture.

To the above ends essentially, and to others which may hereinafter appear, the invention consists of such parts, and such combination of parts which fall within the scope of the invention as claimed.

In the drawings:

Figure 5 is a view similar to Figure 3 with the clutch in non-engaging position.

Figure 6 is a longitudinal section illustrating the clutch.

Figure 7 is an inverted plan of the reel.

Figure 8 is an elevation of the anchoring elements for the reel.

Figure 9 is an elevation showing the bottom member of the reel.

Figure 10 is a detail illustrating the clutch gear.

Figure 11 is a section on line 11—11 Figure 5.

Figure 12 is an end view of the spool.

Figure 13 is a fragmentary view illustrating the clutching gear and shifting lever for the latter.

Figure 1:
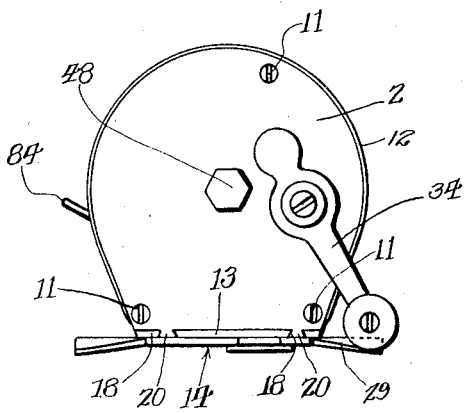
Figure 1 is an elevation looking towards one side of the reel.
Figure 2:
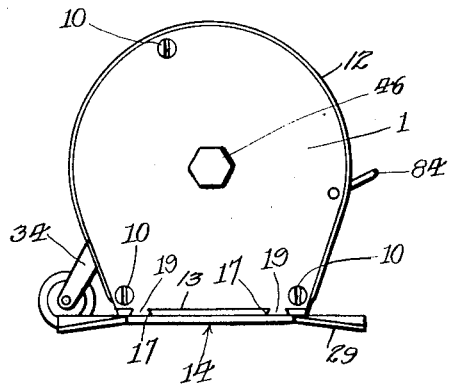
Figure 2 is a view similar to Figure 1 looking towards the other side of the reel.
Figure 3:
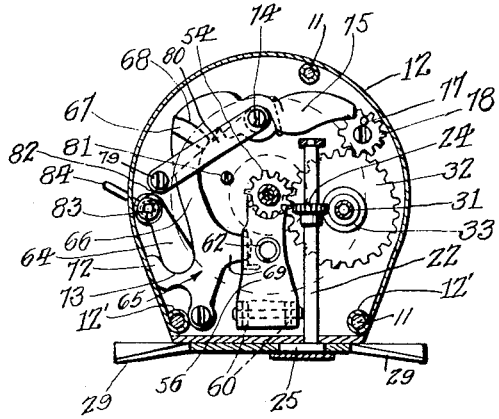
Figure 3 is a vertical sectional view on line 3—3 Figure 4 illustrating the clutch in engaging position.
Figure 4:
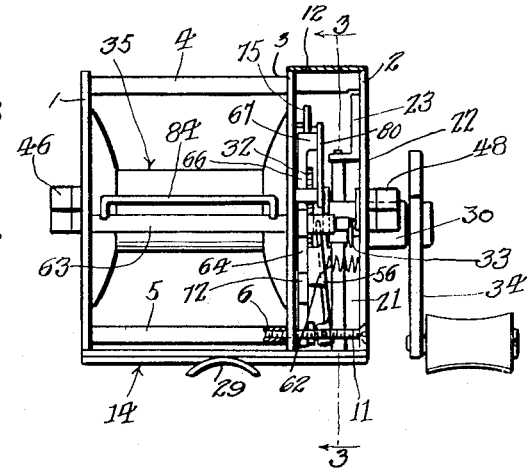
Figure 4 is a rear elevation partly in section of the reel.

Referring to the drawings in detail, the reel includes a pair of side plates 1, 2 and an intermediate plate 3 arranged in parallel spaced relation. The distance between plates 1, 3 is greater than that between plates 2, 3. An upper tubular bar 4 and a pair of spaced parallel lower tubular bars 5, 6 are arranged between plates 1, 3. Sleeves 7, 8 and 9 are arranged in endwise alignment with respect to bars 4, 5 and 6 and are interposed between plates 2, 3. Holdfast devices 10 are employed for connecting the bars to plate 1. Holdfast devices 11 are employed for connecting the bars to plate 3 and the sleeves to plates 2, 3. A strap 12 is seated against the top and side edges of plates 2, 3 and has its ends 12' encompassing sleeves 8, 9.

The plate 3 has its bottom edge seated transversely of the upper face of a rectangular member 13 which is positioned upon the reel anchoring element 14. The member 13 is formed with a central circular opening 15 and an opening 16 in proximity to one end thereof. The opening 16 is of less diameter than opening 15 and positioned to one side of the longitudinal median of member 13. The latter has one end formed with a pair of spaced tapered grooves 17 and its other end with a pair of spaced tapered grooves 18. The plate 1 has depending from its bottom edge a pair of spaced tapered tongues 19 which engage in grooves 17. The plate 2 has depending from its bottom edge a pair of spaced tapered tongues 20 which engage in grooves 18. The grooves 17, 18 in connection with the tongues 19, 20 secure the plates 1, 2 to the member 13.

The plates 2, 3, strap 12 and member 13 provide a closed compartment 21 in which is arranged a vertically disposed rotatable shaft 22 having its upper end journaled in the lower end of an upstanding angle-shaped bracket 23 secured to the inner face of plate 2. A worm pinion 24 is attached to shaft 22, the latter extending down through opening 16 and having its lower end provided with a cam 25 operating against the side walls of a slot 26 formed in the element 14 lengthwise of the latter.

The element 14 comprises a body part 27 of less length and width than that of member 13. The slot 26 is formed in body part 27 to one side of its longitudinal and transverse medians of body part 27 and opens at one end of the latter. Secured upon the upper face of body part 27, centrally thereof is a circular disc 28 which extends into and is of the same thickness as the height of the wall of opening 15. The member 13 oscillates about the edge of disc 28 and which is oscillated by the coaction of cam 25 with the side walls of slot 26 on the rotation of shaft 22. The body part 27 centrally of each lengthwise edge thereof is formed with a laterally extending tongue 29. The tongues are to engage under a pair of bands, not shown, on the fishing rod handle, not shown, whereby the reel will be anchored to the rod.

The plate 2 has extending from its outer face a sleeve 30 and journaled in the latter, as well as extending through plate 2 is a shaft 31 carrying on its inner end a gear 32. Shaft 31 between gear 32 and plate 2 is provided with a worm 33. The outer end of shaft 31 has fixed thereto a handle element 34 for operating it. The worm 33 engages with pinion 24 for operating shaft 22 on the rotation of shaft 31. The gear 32 is adapted to operate a revolving means for a spool 35 to provide for the winding thereon of a line, not shown.

The spool 35 includes a tubular body part 36 and a pair of oppositely disposed concavo-convex side cheeks 37 at the ends of body part 36. The cheeks 37 extend into and have the outer edges thereof travel in circular grooves 38 formed in the opposed faces of plates 1, 3. One end of body part 36 has secured thereto a clutch member in the form of a disc 39 provided on its outer face with a pair of spaced, superposed, aligning lugs 40 arranged above and below the axis of the disc. Extending through the body part 36, as well as being secured thereto, is a shaft 41 which includes an enlarged intermediate portion 42 and a pair of reduced end portions 43, 44, the former being of less length than the latter. The portion 42 extends through disc 39 and plate 3. A peripherally flanged bearing sleeve 45 is mounted intermediate its end in plate 1, and end portion 43 of shaft 41 is journaled therein. The sleeve 45 is closed at its outer end by a cap 46. A peripherally flanged bearing sleeve 47 is mounted intermediate its ends in plate 2 and has its outer end closed by a cap 48. Washers 49, 50 are interposed between the caps 46, 48 respectively and the plates 1, 2 respectively. The end portion 44 of shaft 41 is journaled in sleeve 47, the latter extending to and is of the same diameter as the intermediate portion of shaft 41. Slidably mounted on the sleeve 47 and intermediate portion of shaft 41 is a shiftable clutching member which associates with the other clutching member and is in the form of a clutching gear device comprising a sleeve 51 having one end formed with diametrically disposed notches 52 to receive the lugs 40. The other end of sleeve 51 is formed with a flange 53. The sleeve 51 is also formed with a gear 54 spaced from flange 53 to provide a groove 55. Associated with the shiftable clutching member is a spring controlled shifting lever 56 therefor. The lever 56 is vertically disposed and has a bifurcated upper end 57 for extension into groove 55. The lower end of lever 56 is provided with a pair of right angularly disposed apertured ears 58 which are pivotally connected as at 59 to a pair of spaced lugs 60 extended from plate 3. The lever 56 is also formed at one said edge, intermediate its ends with an inclined protuberance 61 which extends towards plate 3. The controlling spring for lever 56 is indicated at 62 and which normally tends to maintain the lever at an inclination towards plate 3 and with the shiftable clutching member in clutching engagement with the clutching member on the spool. When the clutching members are in engagement the spool is coupled with its revolving means and is not freely revoluble.

Pivotally mounted in the plates 1, 3 and extending from plate 3 is a rock shaft 63 carrying a trip arm 64 for an upstanding lever 65, the latter being formed with a curved upper arm 66 provided with an enlarged top end 67 having an inclined end edge 68. The arm 66 is formed with a lateral protuberance 69 at its lower end which extends towards and coacts with the protuberance 61 for moving lever 56 in a direction to bring the clutching members out of clutching engagement when lever 65 is moved in a direction towards lever 56. The lever 65 also includes a lower arm 70 which is pivotally connected at its lower end, as at 71 to plate 3. The arm 70 merges at its upper end into the lower end of arm 66. The lever 65 is further formed with a curved lateral arm 72 which extends outwardly from arm 66 and forms in connection with the latter a gullet 73 for the reception of the lower portion of trip arm 64. The gullet 73 conforms in contour to the lower portion of arm 64. The wall of the gullet snugly engages said lower portion. Pivotally mounted intermediate its ends on a stud 74 carried by plate 3, is a releasable latching lever 75 for the lever 65. One end of lever 75 has a V-shaped notch 76 for receiving one corner of the upper end of arm 66 of lever 75. The other end of lever 75 is arranged in the path of a trip pin 77 carried by a pinion 78 operated from the gear 32. A stud 79 is provided on plate 3 and attached thereto is one end of a flat link 80, the other end of the latter is attached to stud 74. The link 80 provides a retaining means for the arm 66 of lever 65, as such arm is arranged between link 80 and plate 3. When the lever 65 is in normal position the notched end of lever 75 seats on the inclined upper end edge of the lever 65. A stop pin 81 is carried by plate 3 and is provided for limiting the shifting of lever 65 from normal position.

The trip arm 64 and lever 75 are spring controlled and the controlling spring therefor is indicated at 82. The latter extends around a sleeve 83 which is fixed to shaft 63 and carries arm 64. The spring 82 also extends around stud 74. One end terminal portion of spring 82 is connected to arm 64 and the other end terminal portion is attached to lever 75.

An outwardly directed finger piece 84 is attached to shaft 63, and which when depressed will rock the shaft to cause the trip arm 64 to move lever 65 on its pivot in a direction towards lever 56, providing for the protuberance 69 to ride under the protuberance 61 whereby lever 56 will be shifted in a direction to unclutch the spool from the driving gear 32. As lever 65 moves towards lever 56, the lever 75 will be shifted on its pivot so that an upper end corner of lever 65 will engage in the notch of lever 75 and retain it in such position until lever 75 is tripped by pin 77 carried by pinion 78. The spool now is in a position whereby it is freely revoluble. On operating shaft 31, pinion 78 will be revolved from gear 32 to provide for pin 77 to trip lever 75 for the purpose of releasing lever 65, which will be returned to its normal position by its controlling spring. When lever 65 is released protuberance 69 is moved clear of protuberance 61 and lever 56 then being released is caused to move to its normal position which causes the slidable clutching member to engage with the clutching member on the spool, whereby the latter may be revolved from gear 32 in connection with gear 54 when shaft 31 is revolved. The gear 54 is brought into meshing engagement with gear 32 when lever 56 is moved to normal position. When the spool is revolved from gear 32, the worm on shaft 31 will provide for the operation of the shaft 22 culminating in imparting an oscillatory movement to the reel upon element 14 and providing for even winding of the line.

What I claim is:—

1. A fishing reel comprising, a slotted anchoring element, a super-structure mounted for oscillation thereon, a spool revolving mechanism bodily carried by said structure, and a rotatable shaft operated from said mechanism and provided with a cam engaging in and coacting with opposed walls of the slot in said element for oscillating said structure during the operation of said mechanism.

2. A fishing reel comprising, a revoluble spool, a revolving mechanism therefor, a spring controlled normally active clutching mechanism for clutching the spool with its revolving mechanism and including a member fixed to the spool and a member slidable towards and from said other member, said members having coacting interengaging means for normally clutching them together, said slidable member including a gear normally driven from said revolving mechanism, a normally inactive spring controlled means for shifting the slidable member free of said revolving mechanism to provide for the spool being freely revoluble, means for making said shifting means active to provide for the free revolving of the spool, releasable means for latching said shifting means active, and means operated from said revolving mechanism on the operation of the latter when the spool is in its freely revoluble position for automatically releasing said latching means to provide for the shifting means and slidable member to return respectively to inactive and driven positions whereby the spool is revolved from its revolving mechanism.

3. A fishing reel comprising, a revoluble spool, a revolving mechanism therefor, a spring controlled normally active clutching mechanism for clutching the spool with its revolving mechanism and including a member fixed to the spool and a member slidable towards and from said other member, said members having coacting interengaging means for normally clutching them together, said slidable member including a gear normally driven from said revolving mechanism, a normally inactive spring controlled means for shifting the slidable member free of said revolving mechanism to provide for the spool being freely revoluble, means for making said shifting means active to provide for the freely revolving of the spool, releasable means for latching said shifting means active, means operated from said revolving mechanism on the operation of the latter when the spool is in its freely revoluble position for automatically releasing said latching means to provide for the shifting means and slidable member to return respectively to inactive and driven positions whereby the spool is revolved from its revolving mechanism, and a controlling spring common to said shifting and latching means.

4. In a fishing reel, a spool, a revolving mechanism therefor, a normally active spring controlled clutching mechanism for normally coupling the spool to said revolving mechanism, said clutching mechanism including a pivoted part provided with a protuberance and a revolubly mounted slidable part shifted by said pivoted part and formed with a gear normally driven from said revolving mechanism, a normally inactive spring controlled shifting mechanism including a protuberance coacting with said other protuberance when said shifting mechanism is made active for moving said slidable part free of said revolving mechanism to provide for the free revolving of the spool, a spring controlled normally inactive latching mechanism operated in one direction from the shifting mechanism and including a notch for receiving a part of said shifting mechanism to latch the latter in active position, means for making active said shifting mechanism, and means revolved from said revolving mechanism on the operation of the latter when the spool is in freely revolving position for releasing said latching means to provide for the automatic clutch of the spool with the revolving mechanism.

5. In a fishing reel, a revoluble spool, a stationary shaft therefor, a spool revolving mechanism, a clutching member carried by the spool, a revoluble clutching member slidably mounted on said shaft and including a gear normally driven from said mechanism, said members having coacting means for normally clutching them together to provide for the revolving of the spool from said mechanism, a shiftable pivoted spring controlled element acting on said slidable member for normally maintaining the members in clutching engagement, a normally inactive spring controlled pivoted shifting lever for said element, said lever having means acting, when shifted to active position for moving said element to cause the latter to shift said slidable member free of said other member and said gear free of said mechanism to provide for the freely revolving of the spool independent of said mechanism, a rock shaft provided with means for shifting said lever to active position, a pivoted spring controlled latching member for said lever holding the latter in active position, and a revoluble member operated from said mechanism when the latter is in nondriving position for the gear and provided with means for moving the latching member to release said lever from active position whereby the spool will be coupled with said mechanism to be revolved by the latter.

6. In a fishing reel, a revoluble spool, a stationary shaft therefor, a spool revolving mechanism, a clutch member fixed to the spool, a revoluble clutching member slidably mounted on said shaft and including a gear normally driven from said mechanism, said members having coacting means for normally clutching them together to provide for the revolving of the spool from said mechanism, a shiftable pivoted spring controlled element acting on said slidable member for normally maintaining the members in clutching engagement, a normally inactive, spring controlled shifting lever for said element, said lever having means acting, when shifting to active position to engage and move said element in a direction to provide for the latter shifting the slidable member free of said other member and said gear free of said mechanism to enable for the free revolving of the spool independent of said mechanism, and a rock shaft carrying means acting on said lever for shifting the latter to active position, and means extended from said rock shaft to enable the rocking of the latter in one direction. IRA L. SPENNY.